Dec. 9, 1969    J. A. OGLE ET AL    3,483,388
APPARATUS FOR GENERATING SIGNALS INDICATIVE OF THE
PERSISTENCE CHARACTERISTICS OF SUBSTANCES MADE
RADIANT BY ENERGIZING RADIATION
Filed Sept. 2, 1964    2 Sheets-Sheet 1

INVENTORS.
JAMES A. OGLE
BURTON ASKOWITH
BY
George L. Kensinger
AGENT

INVENTORS.
JAMES A. OGLE
BURTON ASKOWITH
BY
George L. Koninger
AGENT

United States Patent Office 3,483,388
Patented Dec. 9, 1969

3,483,388
APPARATUS FOR GENERATING SIGNALS INDICATIVE OF THE PERSISTENCE CHARACTERISTICS OF SUBSTANCES MADE RADIANT BY ENERGIZING RADIATION
James A. Ogle, Paoli, Pa., and Burton J. Askowith, Orlando, Fla., assignors to Burroughs Corporation, Detroit, Mich., a corporation of Michigan
Filed Sept. 2, 1964, Ser. No. 393,929
Int. Cl. G01n 21/30, 21/16
U.S. Cl. 250—219                    12 Claims

ABSTRACT OF THE DISCLOSURE

A source of pulsed energizing radiation is projected onto a document having luminescent indicia deposited thereon. A detector or scanner senses the amounts of secondary radiation being generated by discrete portions of the document. Radiation generated by the luminescent indicia is distinguished from that from other substances on the paper having luminescent characteristics, by the fact that the radiation generated by the indicia has a much longer persistence. The detector output is averaged and the signal generated during the sensing of the luminescent indicia is of a higher average value than that from the other luminescent materials.

---

This invention relates to an improved system for the detection of, and distinction between, excited substances which exhibit different persistence characteristics. More specifically, this invention is concerned with distinguishing information coded in the form of fluorescent or phosphorescent spots on documents from spurious smudges or markings which may tend to obscure the recorded information so coded.

The use of fluorescent or phosphorescent markings for the recording of information has been found to be desirable in the interest of preserving certain well-established record forms, documents, and other printed materials which have a wide acceptance and where the development of substitute record arrangements would be both expensive and of questionable advantage. The passbooks, deposit tickets, and withdrawal orders of savings bank operations are typical of such items. Accordingly, it is advantageous to utilize, for example, fluorescent materials for printing or coding on such documents to enable optical or mechanical reading thereof or for providing practically invisible printing if it is desirable to avoid interference with ordinary matter printed thereon. This luminescent material can then be irradiated with high energy radiation such as actinic rays, ultraviolet light or soft X-rays, and the resulting luminescent radiation utilized in data reading operations.

A difficulty which arises in the use of luminescent materials for the printing or coding of record members is that many substances which may be deposited on or impregnated in such members during the preparation or normal handling thereof also exhibit some degree of luminescence. Bleaches used in the preparation of record surfaces, inks used in customary printing, and smudges from greases, oils, marking devices and other foreign materials acquired during processing and handling are typical of sources of undesirable luminescence signals which will be emanated from such records upon being exposed to irradiation.

These spurious signals add to the background noise-signal level in detector circuits utilized in reading systems and may present such a spurious level as to introduce a false signal. The present invention is employed to read luminescent codings on records in a manner which enhances the signal-to-noise ratio of desired signals and will assure against the transmission of false signals from spurious markings. In the embodiment illustrated, the data is recorded in a pattern of fluorescent or phosphorescent spots interspersed with areas in which no luminescent material has been deposited. Reading is accomplished by exposing radiant-energy sensitive detector means to the recorded data pattern when in an excited and radiating state.

Since some spurious and some marking-device luminescent materials may reflect and emanate overlapping or approximately the same level of radiation while being irradiated, as do luminescent inks, the luminescently coded data cannot be distinguished reliably by radiation amplitude discrimination while subject to irradiation. Different luminescent materials do exhibit different persistence characteristics, however, and can be distinguished by that property.

It has been observed that the fluorescence exhibited by spurious marks on documents such as background printing and coloring, random stains, identification marks and smears, and endorsement markings, is, with few exceptions, of a short persistence nature. Radiation emanated from these marks decays to zero luminescence in less than one millisecond and to 37% of peak in about 0.2 millisecond. In order that the recorded spots may be distinguished from these spurious marks, the materials chosen for encoding information on the documents employed are of the "lag" type which exhibit long persistence. Radiation emanated from these materials or inks will decay to 37% of peak only after approximately 14 milliseconds.

An example of prior art apparatus for distinguishing between luminescent materials of differing persistence characteristics is shown in application Ser. No. 41,349 by John H. Howard, filed on July 7, 1960, now Patent No. 3,169,186, of common ownership herewith, in which a delay between excitation and detection of a record member is relied upon for discerning whether or not an information recording exists at a recording location. The period of delay provided between excitation and detection permits the emanated radiation of short persistence materials to decrease with respect to the emanated radiation of the longer persistence material. It is necessary in such synchronously operated systems that apparatus be constructed to provide a constant and controllable delay between the energization signal and the detection gating signal. Provision of this delay period frequently necessitates the provision of externally developed clock or strobe pulses or an internally included and accurate delay device. A significant advantage of the present invention over prior art techniques is elimination of the necessity of providing such an accurate and carefully controlled gating function and improvement of the operation of luminescent-spot readers and detectors.

While the invention is illustrated in embodiments concerned with the reading of coded documents, it should be noted that the techniques and principles of operation fundamental to the present invention may be utilized for distinguishing between substances or for testing substances with respect to the reference for discerning the nature of the substance under test. For instance, the methods of operation contemplated may be advantageously used for distinguishing between any two substances having detectably different persistence characteristics or excitation lifetimes, such as excited fluorescent or phosphorescent substances including the so-called "fluors," or substances made radioactive by exposure to excitation, or for distinguishing between structures excited by exposure to thermal energy. Any structure subject to being excited physically or chemically to radiate energy at a specific rate may be distinguished by the method and apparatus of this invention.

Accordingly, an object of this invention is to improve upon known techniques for the reading of documents coded with luminescent materials for representing information data and to achieve a more accurate operation of such a system regardless of the preparation, treatment, handling, or abuse to which a record member may have been subjected.

Another object of this invention is to provide a method and apparatus for distinguishing between substances having differing persistence or excitation lifetime characteristics.

A further object of the subject invention is to minimize the effect of spurious signals upon luminescent-spot, record-reading apparatus.

For accomplishing the above objects, there is provided an improved photoelectric coded data irradiating and reading method and apparatus including a pulsed or periodic source of photon or wave energy radiation for exciting long persistence luminescent spots representative of data information appearing on a document, means for detecting the radiation emanated from such luminescent spots and for discriminating between different luminescent substances without delaying detection between periods of excitation by averaging the signals derived and, in some instances, gating different frequency components against each other for canceling signals from spurious marks. The invention enables the scanning of such a record or data bearing member while said detection is accomplished.

A feature of the present invention is an improvement and simplification of methods for testing luminescent materials which includes the generation of an electrical signal indicative of the persistence characteristics thereof. A further feature of this invention resides in the increased rate of examining substances subject to being excited which is made possible by eliminating the necessity of providing a delay between the steps of irradiating the substance and detecting the energy released therefrom.

The apparatus of the subject invention is capable of producing signals which indicate the differences in the persistence characteristic of the materials being examined even though the intensity of emanated radiation from different luminescent substances or from materials of different persistence qualities may be nearly equal.

The foregoing and other objects of this invention will be readily understood from a reading of the following description and claims together with the accompanying drawings wherein:

In this specification the term "fluorescence" is used to refer to the property of emitting radiation or the radiation thereby emitted as the immediate result of, both during and for a short time after, the absorption of radiation from some other source although it may appear to the naked eye to emit radiation only during the absorption of such radiation.

The term "phosphorescence" refers to the state or property of emitting light or the light so produced as caused by exposure to light or other forms of radiation and visibly lasting after exposure has ceased.

Finally, "luminescence" is used generically to refer to the emission of light or the light so emitted not ascribable directly to incandescence and which may be produced by exposure to light or other radiation.

For a more detailed description of the fundamental characteristics of fluorescent and phosphorescent materials, reference may be had to pp. 743–744 of Physics Principles and Applications (1953, 2nd ed.) by Margenau, Watson, and Montgomery (McGraw-Hill Book Co.).

Figure 1:
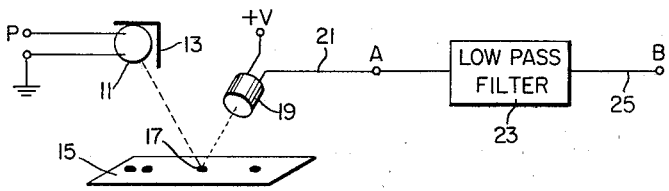
FIG. 1 is a functional diagram of a first embodiment of an electrically operated system constructed in accordance with this invention.

Referring to FIG. 1, an asynchronous detector system is shown in which a source of radiation 11 is employed for exciting luminescent areas 17, for example, appearing upon a record medium or other surface 15. The source of radiation 11, which may be an ultraviolet lamp, is driven by a signal applied to input terminals P of the lamp, one of which is grounded as indicated. Photoelectric detector 19 is positioned to sense radiation emanated and reflected by luminescent areas 17 and may be a photomultiplier tube, a photocell, or other radiation-responsive device. A shield 13 partially surrounds the lamp 11 to prevent radiation therefrom from striking a photoelectric detector 19 directly.

Photodetector 19 is shown referenced to a positive voltage and provides an output signal on its output lead 21. It is noted that although photomultiplier tubes are usually referenced to a source of negative voltage, it is possible to reference them to a positive voltage as the photoelectric detector is shown referenced in FIG. 1. Photodetector output lead 21 is connected to the input of a low pass filter 23 which may also be described as an integrating or averaging circuit. The output of filter 23 is by lead 25.

Figure 2:
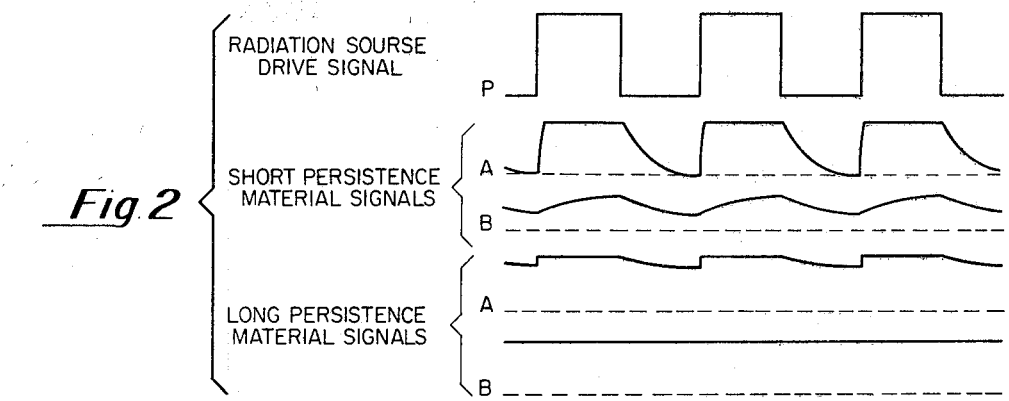
FIG. 2 is a representation of electrical waveforms plotted with respect to time which appear during the operation of the apparatus of FIG. 1 at the points designated P, A, and B.

In FIG. 2 is shown a representation of electrical waveforms which may be developed at points P, A, and B in the apparatus as illustrated in FIG. 1. A radiation source drive signal is supplied to the lamp 11 at its input terminals P. This signal is illustrated generally in FIG. 2, waveform P, as a symmetrical pulsed signal.

Also shown in FIG. 2 are the electrical waveforms of the signals which would appear at input A and output B of filter 23 if the luminescent area 17 under observation were in one case short persistence material and in another case long persistence material as noted on the figure. Of course, any amplitude varying signal may be applied to input terminals of the lamp.

The radiation delivered to photodetector 19 by short persistence materials will increase at a rate substantially following the excitation irradiation from lamp 11 and will reach some constant level during the "on" period of the lamp. After the extinction of lamp 11, the signal at point A will exponentially decay due to the exponential decrease of radiation emanated from the short persistence material at point 17. The decay of the electrical signal at point A will continue until the lamp is again ignited. As low pass filter 23 effectively averages the signal appearing at point A, its output signal (at point B) will be a slowly varying signal centered near the average amplitude of the signal appearing at point A.

When a long persistence material appears on surface 15 in position under lamp 11 and photodetector 19, the radiation upon photodetector 19 will be at some high level during the "on" period of the lamp and then decay only slightly after the extinction of radiation from lamp 11. Thus, the signal at point A for long persistence material will be a slightly varying signal at a high amplitude level and, when passed through the low pass filter 23, will appear at point B substantially as a nonvarying high amplitude signal.

Thus, the signals appearing at point B give an indication of the persistence characteristics of the material under test, which signal will be: an essentially nonvarying high amplitude signal for long persistence material and a slightly varying signal of lesser amplitude for short persistence material.

Any materials having the ability to absorb or retain energy and then release it in a finite period of time, such as fluorescent or phosphorescent spots, substances susceptible to being made radioactive, and substances which absorb thermal energy, may be tested or distinguished with the apparatus of this invention as illustrated in FIG. 1.

If the materials under test are of the luminescent type, the apparatus of FIG. 1 can distinguish between phosphorescent materials having differing persistence characteristics, fluorescent materials having different persistence characteristics, or between fluorescent and phosphorescent materials as such.

Dynamically scanning or rapidly testing a number of luminescent structures with the apparatus of FIG. 1 may be accomplished by moving the record or document surface 15, with respect to the optical system path between lamp 11 and detector 19, or by translating the photodetector 19 or lamp 11 with respect to the surface 15. The only limitation upon the rapidity of such scanning or testing is the necessity of a sufficient portion of waveforms at point B characteristic of the various materials involved for distinguishing between them. The limitation upon the pulse rate of radiation source 11 is determined by the persistence characteristics of the materials under test and upon the characteristics of the lamp itself. There need be only a decay of emanated radiation from one of the material samples with respect to the other of sufficient amount to produce distinguishable signals at point B.

Figure 3:
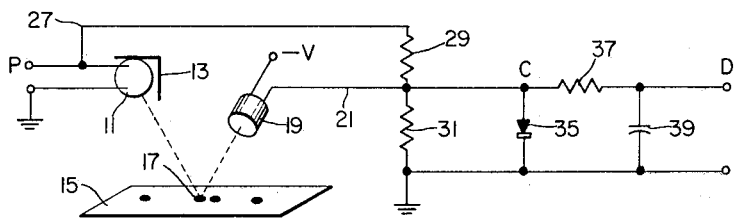
FIG. 3 is a functional diagram of an electrically operated system which is a modification of the system shown generally in FIG. 1.

FIG. 3 is a functional diagram of an electrically operated system of the type illustrated in FIG. 1 wherein the signal delivered to the radiation source 11 at input terminals P is coupled through resistor 29 to the output lead 21 of photodetector 19 for effectively disabling the detector means while the radiation source is energized. The detector means is thus operated alternately with the radiation source. The photodetector output lead 21 is connected to ground through the parallel combination of resistor 31 and diode 35 and to output terminal D through resistor 37 as shown. Capacitor 39 is connected across the system output leads.

Figure 4:
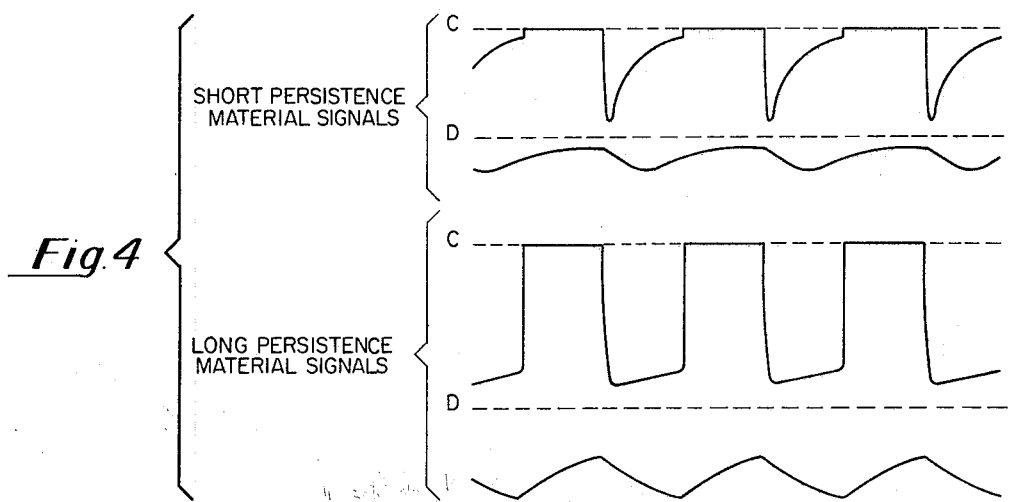
FIG. 4 is a representation of electrical waveforms plotted with respect to time which appear during the operation of the apparatus of FIG. 3 at the points designated C and D.

FIG. 4 is a representation of electrical waveforms which appear at points C and D on opposite ends of resistor 37 in the system of FIG. 3 assuming the application of the radiation source drive signal P of FIG. 2 for relatively short and relatively long persistence materials. Since the photodetector 19 in FIG. 3 is referenced to a negative voltage, the electrical signal at point C is negative-going.

When short persistence material is optically aligned with lamp 11 and photodetector 19, the signal at point C will be driven to ground during the "on" period of the lamp because of the coupling of the positive voltage at point P through connecting lead 27 and resistor 29 which would raise the potential at the junction of resistors 29 and 31 to a positive voltage except for the operation of diode 35 which clamps the signal at point C at substantially ground potential. After the extinction of lamp 11, the waveform at point C will substantially follow the lingering irradiation amplitude from lamp 11 until the persistence characteristic (decay of emanated radiation) of the luminescent material becomes controlling, at which time the electrical signal at point C will begin to decay more or less exponentially. It is noted that the amplitude of the signal at point C for a particular persistence material depends upon the rapidity of decay of the radiation emanated therefrom. The signal at point C will be repeated as the lamp is pulsed. The signal at point D for the short persistence material will be slightly varying and centered around a low negative level representative of the average of the electrical waveform appearing at point C.

When long persistence material is in the optical angle of reflection between the radiation source 11 and the photodetector 19, the electrical signal at point C will be driven to ground during the "on" portion of the lamp and will then rapidly reach some large negative value after which it will slowly decay as indicated in FIG. 4 for long persistence material. The integrated signal at point D for long persistence materials will therefore be a varying signal approximating the average of the waveform appearing at point C.

The system of FIG. 3 is thus capable of providing electrical signals which indicate whether relatively short or relatively long persistence materials are being irradiated by lamp 11: a slightly varying signal of low negative amplitude at point D for short persistence material and a more widely varying signal of much larger negative amplitude at point D for long persistence material.

It is noted that the "ripple" appearing upon the electrical signals at point D of FIG. 3 may be suppressed electronically, if necessary, and thus provide substantially constant negative signals of different amplitudes for materials having differing persistence characteristics.

It is further noted that the apparatus of FIG. 3 may be made to scan or rapidly examine a number of luminescent areas 17 by effecting a translation of the optical system including lamp 11 and photodetector 19 or by translating the record bearing member 15. Examples of apparatus for accomplishing the photoelectric scanning of a record member are illustrated in J. H. Howard Patents Nos. 2,975,966 and 3,051,836, which have an assignee in common herewith.

This apparatus has been operated with the radiation source 11 driven at a 5,000 c.p.s. rate and the luminescent areas 17 sensed for periods of 1.5 to 2.5 milliseconds (a scanning rate of approximately 500 c.p.s.).

The asynchronous system illustrated in FIG. 1 and its modification illustrated in FIG. 3 can be utilized for distinguishing between materials having differing persistence characteristics regardless of whether the levels of radiation emanated therefrom during irradiation are equal. Discrimination is achieved thereby without the complications inherent in prior art synchronously pulsed detector systems which require time sequencing for providing a delay between excitation and detection.

Figure 5:
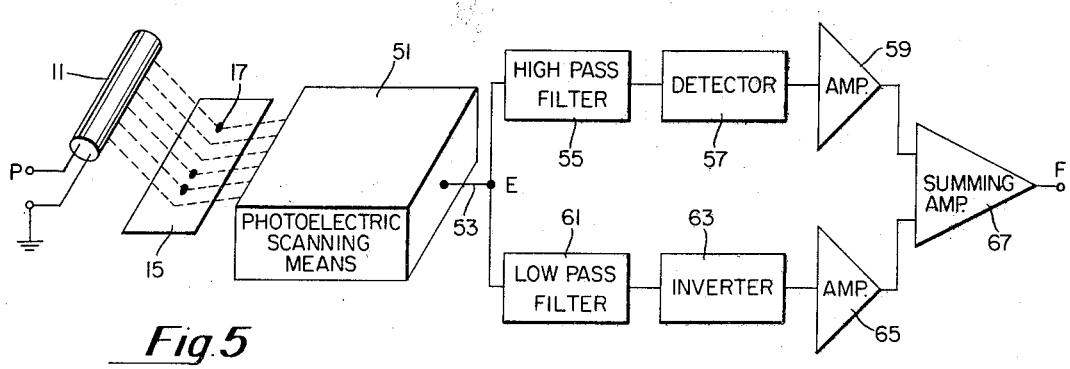
FIG. 5 is a functional diagram of the preferred embodiment of an electrically operated system constructed in accordance with the subject invention.

If it is desired to increase the accuracy of dynamic testing of characteristic energy release rate or persistence or to increase the frequency of energization for enabling an increased rate of scanning, for example, then a frequency discriminating system such as that illustrated in FIG. 5 may be used. This system separates the energization frequency component of the detector signal from the scanning frequency component, detects the envelope of the energization signal component, and negatively mixes the signals thus derived for providing an output signal indicative of the characteristic of the material being examined.

FIG. 5 is a functional diagram of an electrically operated document reader wherein the document surface 15, bearing luminescent areas 17, is photoelectrically scanned by an optical system comprising lamp 11 and photoelectric scanning means 51 of the type illustrated in the before-mentioned patents or others well known in the art. The output lead 53 of photoelectric scanning means 51 is connected to a frequency discriminator circuit at point E. The scanning function, of course, could be accomplished by translating either the lamp 11 or the record surface 15 as well as the detector means.

The discriminating circuit has parallel legs or branches connected to the input of a summing amplifier 67. One leg connected between point E and an input to the summing amplifier 67 consists of a series connection of high pass filter 55, detector 57, and amplifier 59. The other leg connected between point E and another input to the summing amplifier 67 consists of the series connected combination of low pass filter 61, inverter 63, and amplifier 65. The output of summing amplifier 67 is designated point F. Of course, inverter 63 could as well be placed in the discriminating circuit branch including high pass filter 55 instead of being in series with low pass filter 61 without departing from the spirit of the invention.

Figure 6:
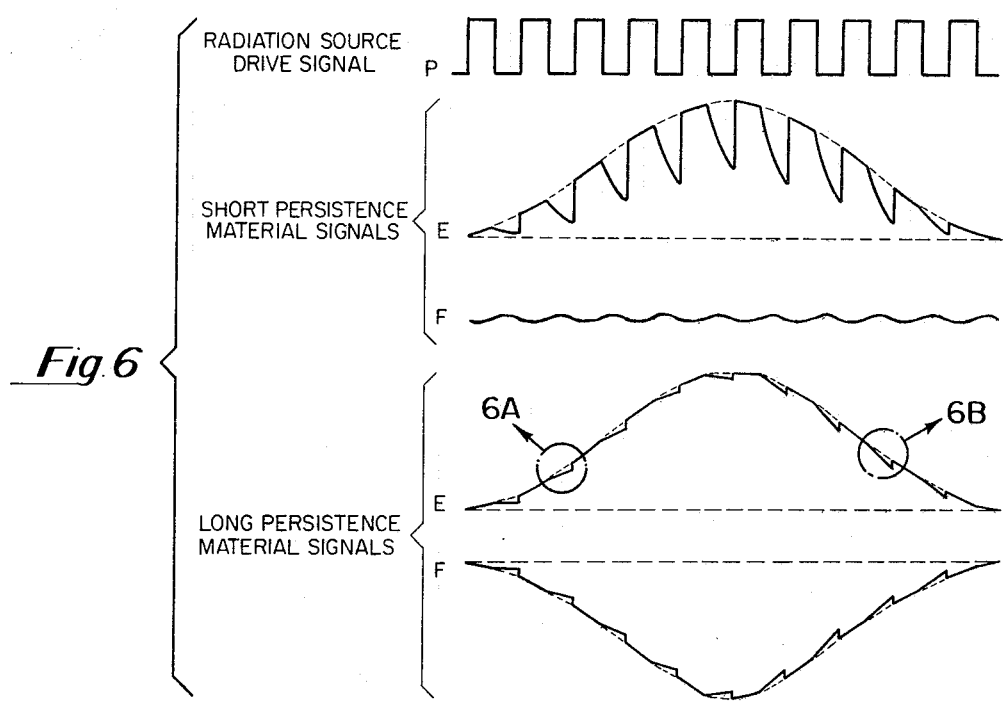
FIG. 6 is a representation of time related electrical waveforms observable at the points designated P, E, and F in the apparatus of the system of FIG. 5.

FIG. 6 is a representation of electrical signal waveforms which are developed at points P, E, and F designated in the system of FIG. 5. The waveform P represents a radiation source drive signal which may be applied to input terminals P of lamp 11.

The electrical waveform which appears at point E during the examination of a short persistence luminescent area is composed of two frequency components: one component corresponding to the drive signal frequency and one component corresponding to the scanning frequency. During the "on" period of the lamp 11, the radiation striking the detector of photoelectric scanning means 51 increases or decreases at a rate corresponding to the scanning frequency, depending upon whether the scanning means is approaching or receding from alignment with an area of luminescent material. Upon extinction of the lamp 11, the short persistence material radiation incident upon the photoelectric detector decreases exponentially due to the exponential decrease in the radiation emanated by the material and the electrical signal at point E thus departs from the envelope corresponding to the scanning frequency component. When the lamp is again energized, the radiation incident upon the photoelectric detector increases rapidly and then follows the scanning frequency envelope since an increasing or decreasing amount of the radiation emanated by the short persistence material is made to strike the photoelectric detector.

The electrical signal waveforms shown in FIG. 6 illustrate the signals that are developed at points E and F of the apparatus of FIG. 5 for a radiation source drive signal frequency of approximately ten times that of the scanning frequency. The operation of the system of FIG. 5 is not limited to the frequency ratio illustrated in FIG. 6. The radiation source drive signal frequency must, however, always be higher than the scanning frequency.

The higher frequency component of the short persistence material signal at point E, that component attributable to the drive signal for the frequency relationship illustrated, passes through high pass filter 55 of FIG. 5. Detector 57 produces a signal therefrom which is representative of the envelope of said high frequency component. The signal is then applied to amplifier 59 and the signal so amplied presented at an input of summing amplifier 67. The low frequency component of the short persistence material signal at point E passes through low pass filter 61, inverter 63, and then amplifier 65 before being presented to another input of summing amplifier 67.

The amplification ratio of amplifiers 59 and 65 is adjusted so that the signals provided to the inputs of summing amplifier 67 are approximately equal when a particular or representative short persistence material is being scanned by photoelectric scanning means 51. The amplification ratio of the two channels is thus determined by the percentage modulation of the radiation source drive signal frequency component with respect to that of the scanning frequency component for short persistence materials.

It is important to note that the operation of the discriminating system of FIG. 5 is independent of the radiation level delivered by lamp source 11 or of the percentage of that radiation which reaches the photoelectric detector. Thus, the signal appearing at the output of summing amplifier 67 (point F) for short persistence material will be of essentially zero amplitude with only slight variations thereon.

Figure 6A:
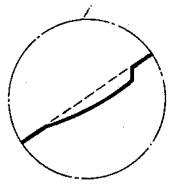
FIG. 6A is an expanded representation of a first segment of a waveform of FIG. 6 which is identified thereon by an inscription designated 6A.
Figure 6B:
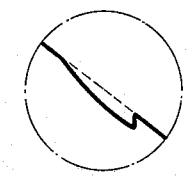
FIG. 6B is an expanded representation of a second portion of a waveform of FIG. 6 which is identified by the designation 6B thereon.

FIG. 6 also illustrates the electrical waveform developed at point E when long persistence material is scanned by the apparatus of FIG. 5. During the "on" period of radiation source 11, the emanated radiation incident upon the photoelectric detector from the long persistence material will vary at a rate corresponding to that of the scanning frequency. When lamp 11 is extinguished and the detector unit is approaching the position of an area of long persistence material, the radiation incident upon the photoelectric detector will increase slowly, always remaining below the envelope characteristic of the scanning frequency as illustrated by the circumscribed segment 6A of FIG. 6 and as enlarged in FIG. 6A. Although the radiation emanated by the long persistence material decays slightly after the extinction of the irradiation, the photoelectric detector, by virtue of its relative movement, detects an increasing amount of radiation from the long persistence area and thus the photoelectric detector signal increases slowly rather than decreasing slightly. After the photoelectric detector passes the point of alignment with the long persistence material spot, the electrical signal at point E follows the scanning frequency component when the lamp is energized and then decreases slightly as indicated by the circumscribed segment 6B of FIG. 6 and as magnified in FIG. 6B.

The signal component corresponding to the radiation source drive signal frequency of the waveform at point E is of very small magnitude for long persistence material. The output waveform F of summing amplifier 67 will therefore be essentially the negative of that appearing at point E because the amplified envelope of the high frequency component will have a negligible subtracting effect upon the low frequency component in the summing amplifier. The discrimination system of FIG. 5 will thus produce at point F a relatively high amplitude signal of a frequency corresponding to the scanning rate when examining long persistence material and only a negligible signal at point F when examining short persistence material.

In operating the apparatus of FIG. 5, the low persistence material used had a persistence characteristic such that it would decay to zero luminescence in slightly less than one millisecond and to 37% of peak in slightly less than 0.2 millisecond. The long persistence material used would only decay to 37% of peak in about 14 milliseconds. The ultraviolet lamp used as radiation source 11 was pulsed at a frequency of 5,000 cycles per second and the scanning period was about 0.2 millisecond (and thus a scanning frequency of approximately 500 cycles per second). In the period of time that the ultraviolet lamp was deenergized, i.e., 0.1 millisecond, the radiation emanated by the short persistence material decayed to about 50% of peak while that of the long persistence material decayed only negligibly. The signal at point E of FIG. 5 for long persistence material was found to contain only about 2.5 percent ($\frac{1}{40}$) of the 5,000 c.p.s. radiation source drive signal component which appeared at point E during the examination of short persistence material. The system provided a maximum output signal at point F when detecting long persistence materials and an essentially zero output signal for short persistence materials such as spurious marks or spots on the record cards employed.

It should be noted that 100% modulation of the lamp is not necessary since the ratio of the low frequency component to the high frequency component need only be of a usable signal-to-noise ratio. In addition, when the system is operated with an ultraviolet illuminator pulsed at frequencies higher than that at which it can be 100% modulated, the irradiation level thereby provided is still usable in this system, as previously noted.

Figure 7:
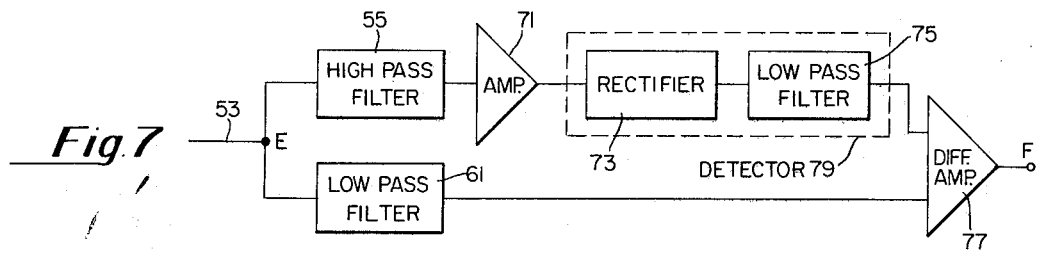
FIG. 7 is an electrical schematic diagram of a modification of the circuit illustrated in the system of FIG. 5.

FIG. 7 is an electrical schematic diagram of a modified form of discrimination circuit for use in the system of FIG. 5. It is designed for coupling to the output lead 53 of the photoelectric scanning means 51. In this discriminator circuit, the high frequency component passes through high pass filter 55 to amplifier 71. A signal representation of the envelope of the high frequency component is produced by detector 79 which consists of a rectifier and low pass filter 55. The high frequency component is supplied along with the low frequency component to differential amplifier 77 in which the high frequency and low frequency components substantially cancel one another during the inspection of short persistence material and do not so cancel each other during the examination of long persistence material.

The system employing the discriminator circuit of FIG. 7 thus provides a large amplitude, low frequency signal upon examining long persistence material and negligible signal upon examining short persistence material.

We claim:

1. In an apparatus for reading a document upon which information is coded with long persistence luminescent materials in a pattern of discrete areas and upon which short persistence luminescent materials may be deposited or impregnated incident to processing and handling of said document, an inspection device comprising:
   pulse-driven excitation means for directing radiant energy toward said document for exciting said luminescent materials on said document into a radiation emitting state,
   photosensitive detector means positioned for continuously receiving radiation from the discrete areas upon said document and for producing an electrical signal proportional thereto, and
   signal averaging means including a low pass filter circuit coupled to said detector means for providing output signals of amplitude proportional to the persistence characteristics of the material which appears upon the document within the area examined.

2. The device of claim 1 further including coupling said excitation means and said detector means for disabling the detector means when the excitation means is being driven.

3. The inspection device of claim 1 characacterized in that the excitation means is periodically pulsed,
   the duration of time between pulses being of sufficient length for a detectable difference to appear between the decay of radiation emanated from the long persistence materials and that from all other materials appearing on said document.

4. The device of claim 3 characterized in that the excitation means is symmetrically pulsed, and means are provided for causing the discrete areas of the document to be scanned during the reading thereof.

5. Apparatus for producing signal representations indicative of the period of excitation decay of a sample of energy absorbent material comprising:
   a pulse-operated source of radiation for exciting said energy absorbent materials into a radiation emanating state by irradiation thereof,
   detector means responsive to radiation reflected and emanated from the irradiated material sample for generating a signal representative of the energy release rate of said sample, said detector means and said pulse-operated source being alternately operated, said detector means being enabled substantially simultaneously with the trailing edge of said pulses of said pulse-operated source, and
   signal representation averaging means coupled to the radiation responsive means for producing an output signal of amplitude indicative of the excitation decay period of the sample.

6. An apparatus for reading a document upon which data is coded with long persistence luminescent material and upon which short persistence luminescent materials may be deposited or impregnated incident to the processing and handling of said document including in combination.
   Continuously operating radiation-responsive detector means for transforming energy radiated from the luminescent materials of said document into electrical signal representations,
   symmetrically pulsed excitation means energizing the luminescent materials of said document so as to emit pulsing radiation emanations,
   signal averaging means connected to said detector means and operable to average the electrical signal representations generated by the detector means as a result of receiving said pulsing radiation-emanations, said averaging means providing output signals exhibiting amplitude characteristics representative of the persistence qualities of particular luminescent materials.

7. Apparatus for reading a document upon which data is coded with long persistence luminescent materials in a pattern of discrete areas and upon which short persistence luminescent materials may be deposited or impregnated incident to the processing and handling of said document, said apparatus comprising:
   irradiation means pulse-operated between two radiation levels for exciting luminescent materials appearing on the document at a rate corresponding to a first frequency,
   radiation-responsive means for continuously monitoring energy radiating from the luminescent materials and generating a signal proportional thereto while successively scanning discrete areas thereof at a rate such that the duration of the signal generated by scanning one of said discrete areas of luminescent material is longer than the pulses of said irradiation means, and
   gating means coupled to said radiation-responsive means for separating said signal generated by said radiation responsive means into components at said first frequency and components below said first frequency, and for generating an output signal only when there are substantially no components at said first frequency.

8. The apparatus of claim 7 wherein the radiation-responsive means is stationary, and relative translational movement is effected between the radiation source and the document.

9. The apparatus of claim 7 wherein the gating means includes:
   an input terminal,
   a suming amplifier,
   first circuit means coupled between said input terminal and said summing amplifier for transmitting a signal corresponding to the envelope of signal components of the first frequency, and
   second circuit means coupled between said input terminal and said summing amplifier for transmitting signal components of frequencies lower than said first frequency,
      one of said circuit means also including inverting means.

10. The apparatus of claim 9 characterized in that the first circuit means includes:
   a high pass filter,
   an envelope detector, and
   a first amplifying means, and
the second circuit means includes:
   a low pass filter,
   an inverter, and
   a second amplifying means,
the amplification ratio of the first and second amplifying means being adjusted to achieve substantial cancellation of signals generated in response to monitoring radiation from typical short persistence materials.

11. The apparatus of claim 7 wherein the gating means includes:
   an input terminal,
   a differential amplifier,
   first circuit means coupled between said input terminal and said differential amplifier for transmitting a signal corresponding to the envelope of signal components of the first frequency, and second circuit means coupled between said input terminal and said differential amplifier for transmitting signal components of frequencies lower than said first frequency.

12. The apparatus of claim 11 characterized in that the first circuit means includes:
a high pass filter,
amplifying means,
rectifying means, and
a low pass filter, and
the second circuit means includes:
a low pass filter,
the amplifying means adjusted to enable cancellation in the differential amplifier of signals generated in response to radiation from typical short persistence materials.

References Cited
UNITED STATES PATENTS

| | | | |
|---|---|---|---|
| 2,827,822 | 3/1958 | Timms | 250—219 |
| 2,928,949 | 3/1960 | Steinbuch | 250—219 |
| 3,051,836 | 8/1962 | Howard | 250—219 |
| 3,105,908 | 10/1963 | Burkhardt et al. | 250—71 X |
| 3,180,988 | 4/1965 | Burkhardt el al. | 250—71 |

WALTER STOLWEIN, Primary Examiner

U.S. Cl. X.R.

235—61.11; 250—71